INVENTORS
HENRY A. WAGNER
MARVIN D. MERRITT
BY ROBERT M. BOKMULLER

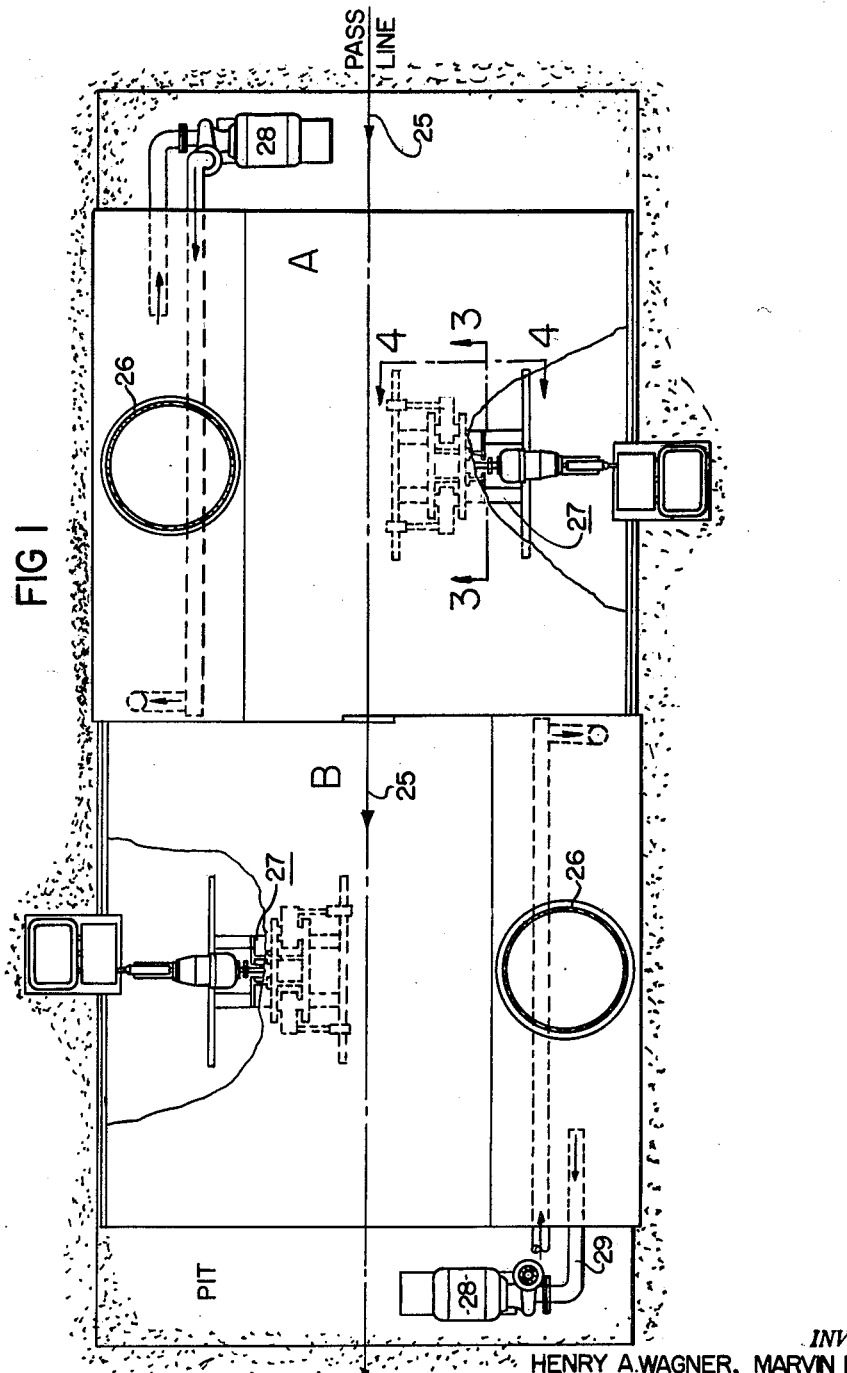

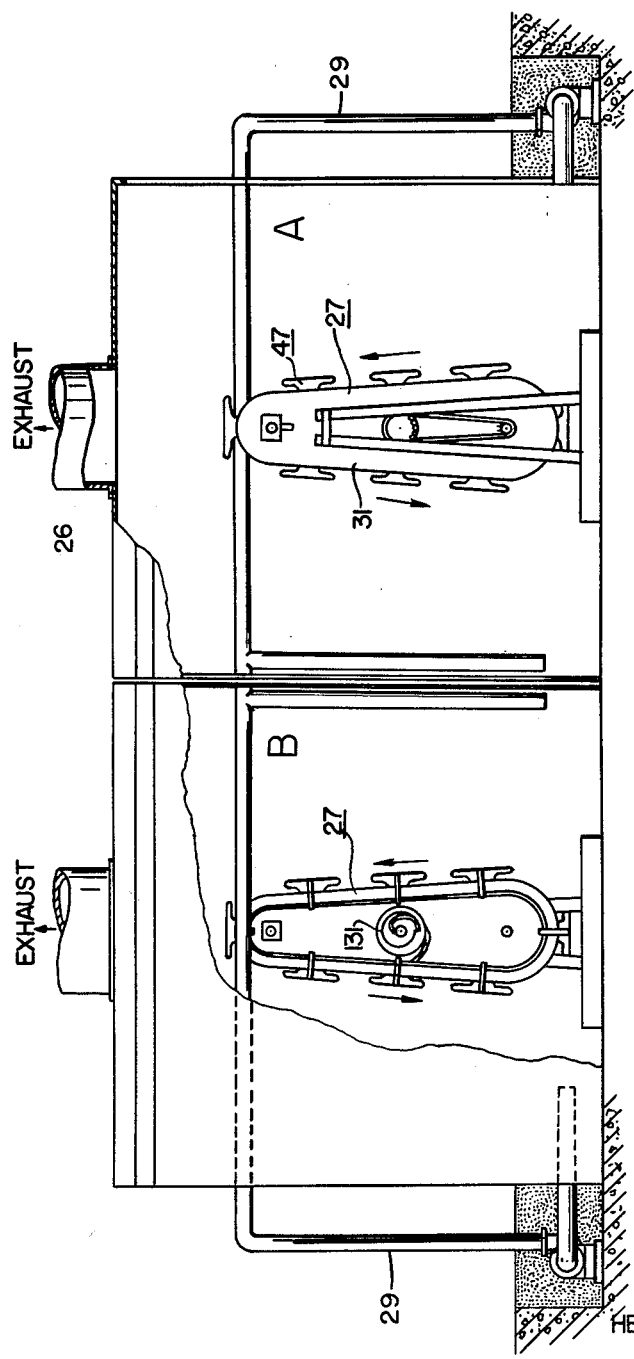

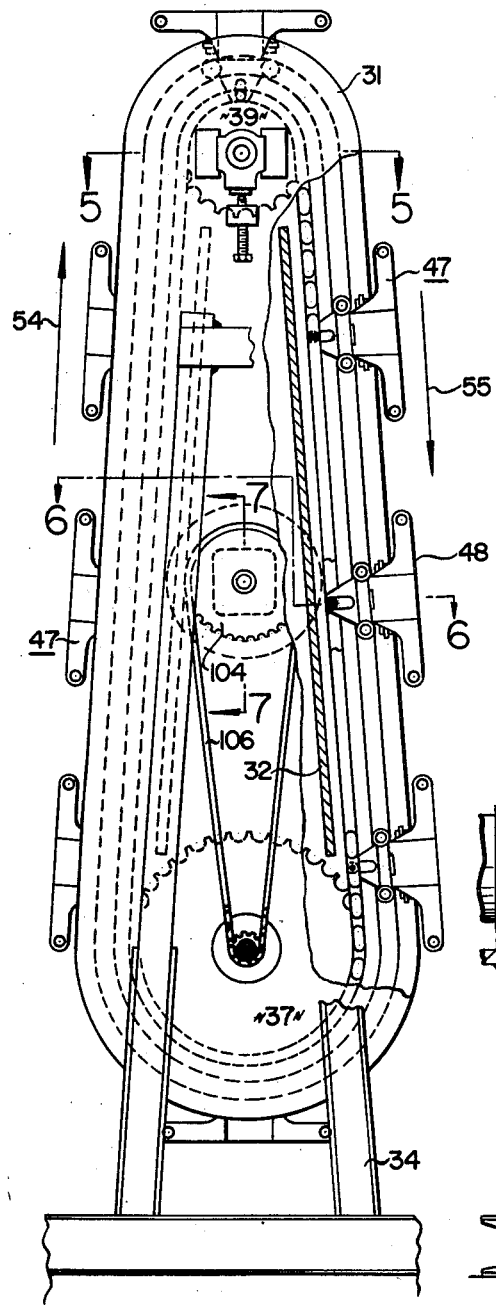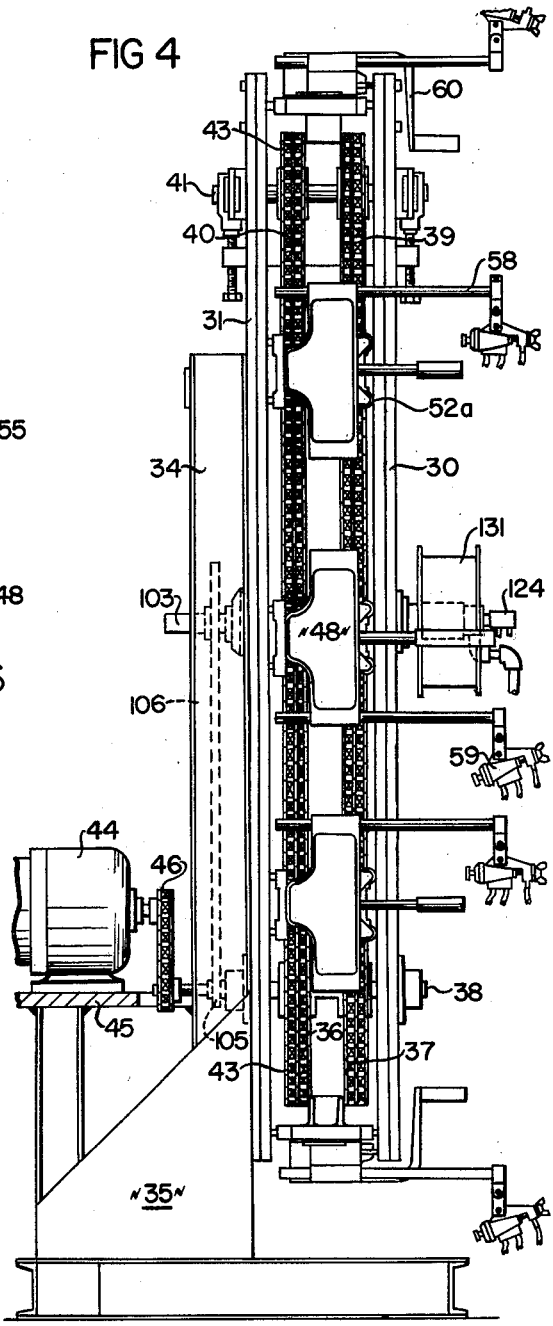

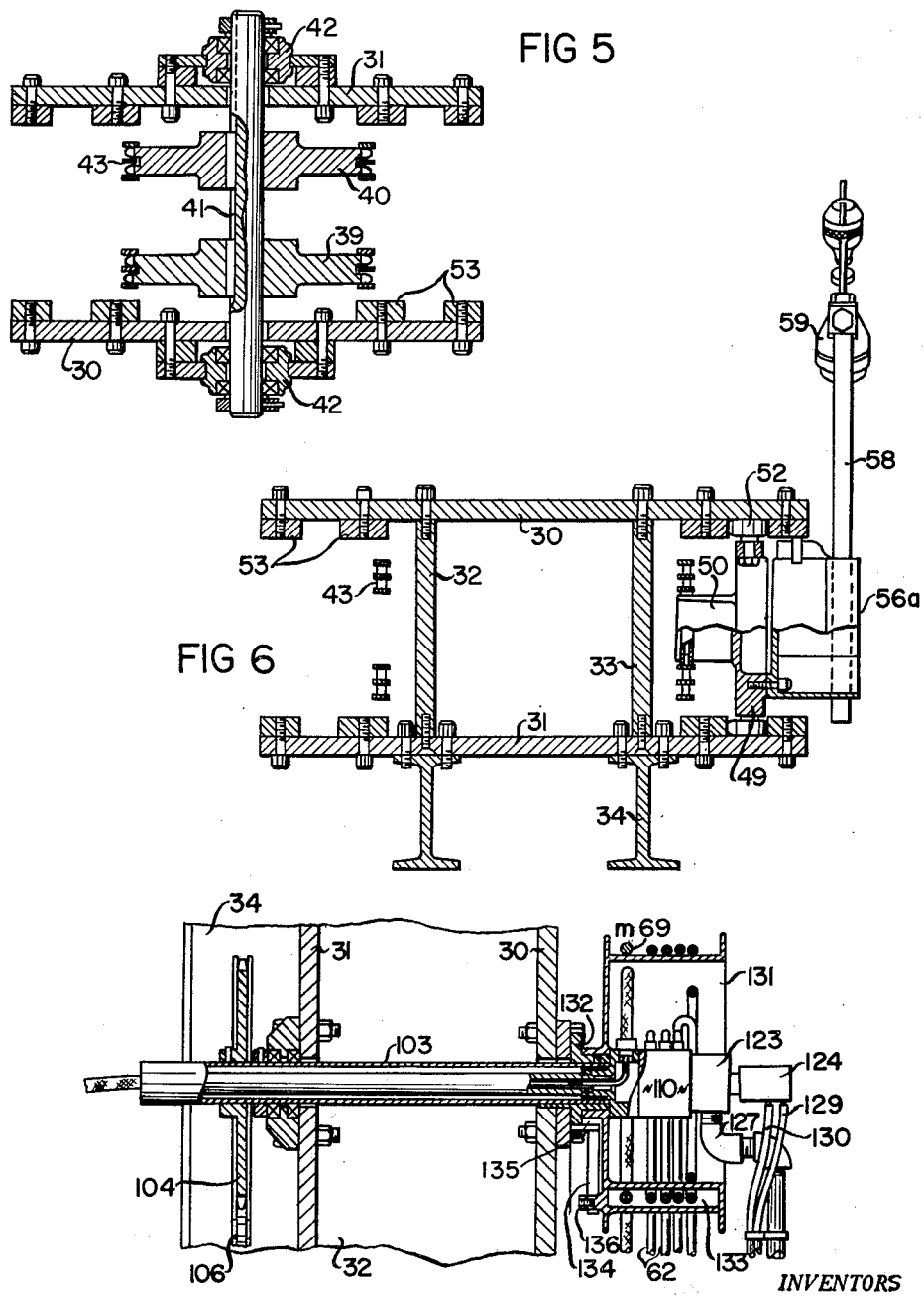

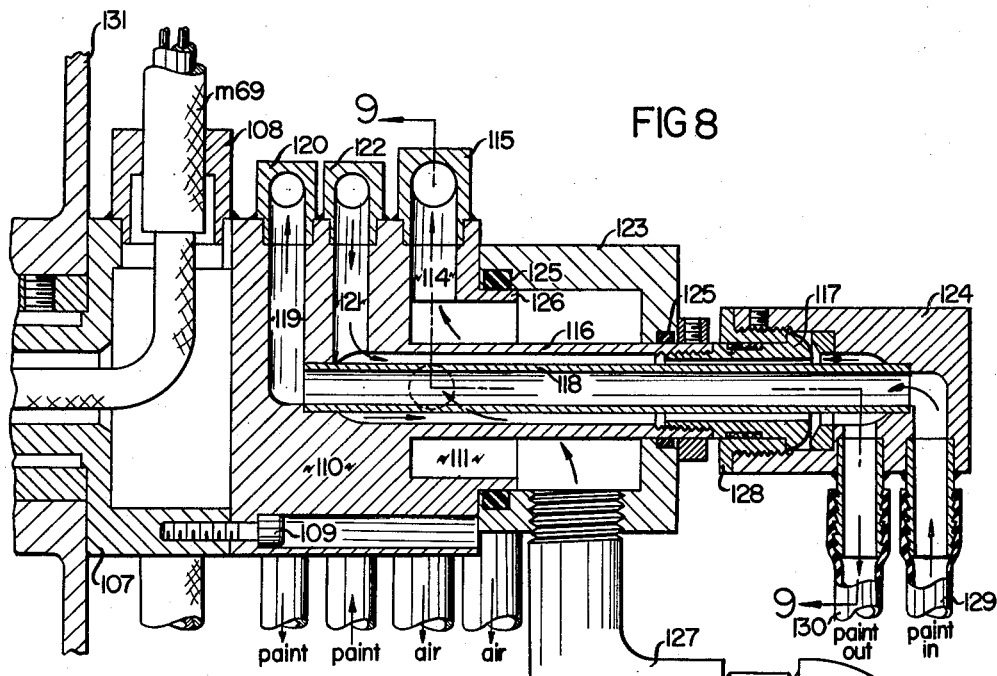
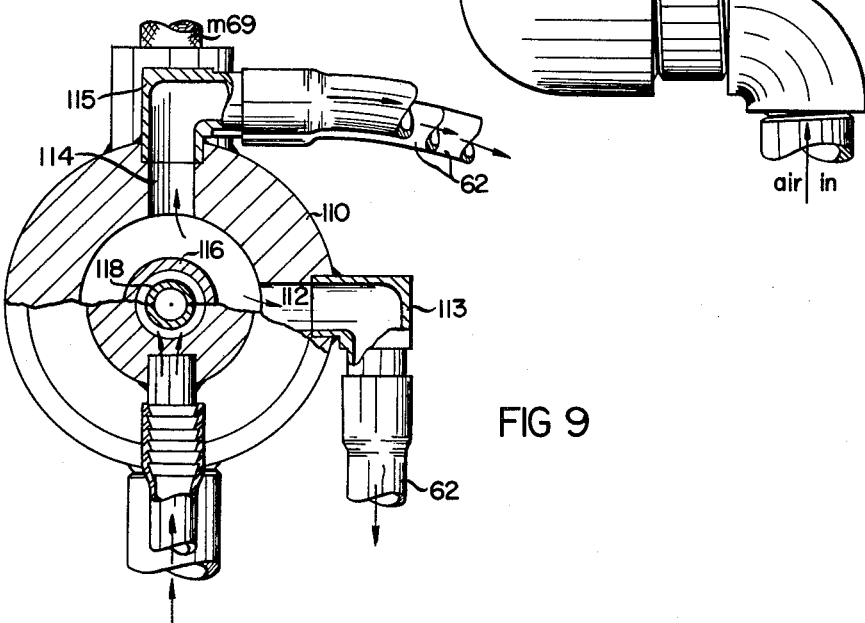

Oberlin, Maky & Donnelly
ATTORNEYS

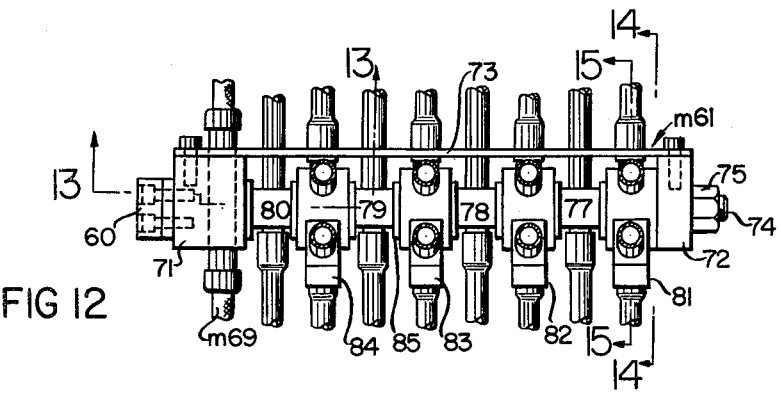

May 18, 1965  H. A. WAGNER ETAL  3,184,328
METHOD AND APPARATUS FOR SPRAYING PAINT
Filed Dec. 30, 1960  10 Sheets-Sheet 9

INVENTORS
HENRY A. WAGNER
MARVIN D. MERRITT
BY ROBERT M. BOKMULLER

Oberlin, Maky & Donnelly
ATTORNEYS

United States Patent Office 3,184,328
Patented May 18, 1965

3,184,328
METHOD AND APPARATUS FOR
SPRAYING PAINT
Henry A. Wagner, Independence, Marvin D. Merritt,
Streetsboro, and Robert M. Bokmuller, Independence,
Ohio, assignors to The E. F. Hauserman Company,
Cleveland, Ohio, a corporation of Ohio
Filed Dec. 30, 1960, Ser. No. 79,871
13 Claims. (Cl. 117—105.3)

The present invention relates to a method and apparatus for spraying paint and, more particularly, to an improved method and apparatus for more effectively spray painting a workpiece while it is in motion.

Normally, in commercially spray painting a series of articles or workpieces, the latter are moved substantially in line past one or more spray guns. At an appropriate time the guns are operated, as by compressed air, to atomize paint supplied to the guns into elliptically shaped sprays which are directed onto the workpiece. In techniques previously employed, many problems have arisen involving non-uniform paint deposition, excessive loss of paint, and the like. If, for example, stationary spray guns are used to paint a passing workpiece, a relatively large number of such guns are necessary. Moreover, the normal spray pattern discharged from a gun is oval shaped with the paint particle concentration heavier in the center than at the edges of the spray pattern. Accordingly, in order to obtain a uniform paint deposition at the edges of a panel workpiece, for example, the spray guns must substantially overspray the edges or periphery of the workpiece. This practice obviously leads to excessive paint losses. The spray guns must in effect spray an area which is greater than the size of the workpiece facing the spray guns. Gang spraying is therefore not acceptable particularly if uniform deposition is important.

In an attempt to overcome these objections, particularly where "three-dimensional" spraying is involved, that is, spraying of the sides, flanges, etc., on a panel or partition wall, it has been suggested to reciprocate a spray gun linearly in a transverse direction across the path in which the workpiece moves. Although this results in some advantages, such as a need for fewer spray guns (indeed, a maximum of about four guns with relatively slow workpiece speed is all that is permissible as a practical matter and often only two guns are used), a problem of uniform deposition still remains. For instance, a reciprocating spray gun tends to form a chevron or W pattern on a sheet where the speed of the moving sheet or workpiece is relatively too fast for the linear speed of the reciprocating spray gun.

It is, therefore, necessary to reduce the rate of movement of the workpiece in reciprocating spray painting with a resulting loss of production; or to accelerate the reciprocation of the spray guns with resulting further problems of feeding paint to the guns, vibration, wear, etc. Further, in order to obtain a uniform paint film (to avoid a W pattern on the work) from an oval spray pattern, it has been determined that the spray pattern should overlap that of a preceding stroke by 50 percent and preferably 75 percent so that paint economy is not necessarily improved. With reciprocating spraying, then, the maximum conveyor speed for moving the workpiece and the gun spraying stroke are dependent upon the maximum reciprocating speed and the usable size of the spray pattern. Still further, in reciprocating spray painting, the continuous W pattern introduces complications in turning the guns on when the leading edge of a workpiece approaches and in turning the guns off when the trailing edge of the workpiece leaves.

In a further attempt to solve these problems of spraying paint, it was suggested to move a spray gun in a rotary or circular path instead of by linear reciprocation. Again the rotary technique provides some advantages over reciprocation in that the conveyor carrying the workpiece can be operated at faster speeds and large spray guns are not required since the guns can follow each other at relatively close intervals around the circumference of a wheel. The guns can move in this manner at relatively fast speeds with relatively low revolutions per minute of the wheel.

However, a rotary spray machine requires considerably more floor space and a longer booth. Another disadvantage is the difference in the coating thickness between the top and the bottom of the spraying stroke. This difference results by the change in direction of the spray gun as it revolves with respect to the linear movement of the workpiece. More specifically, when the spray guns are moving in the same direction as the workpiece, the spray guns remain on each portion of the workpiece for a longer period than when the guns move oppositely to the direction of workpiece movement. Consequently, there results a difference in coating thickness between the top and the bottom of the rotary circular stroke.

Further, since the spray guns on a rotary spraying machine normally travel at faster speeds than the guns of a reciprocating machine, gun fan deflection and proper timing of the actual spray stroke become more of a problem. The rotary path of the spray guns entails considerably more on-off action of the guns as the leading or trailing edges of the workpiece (those perpendicular to the plane of rotation of the rotary stroke) approach or leave the field of the rotary spray stroke. These problems become even more serious when three-dimensional spraying is attempted by rotary spraying means. For three-dimensional spraying all portions of the stroke must have spray guns available that spray at definite compound angles.

The present method and apparatus combine the straight strokes of a reciprocator and the frequent passes of the rotary spraying technique. A uniform deposition of paint is accomplished without reducing the rate of production and without excessive loss of paint as overspray. Desirably, scanning means for the workpiece can be used, if desired, in conjunction with the spraying apparatus to control the operation of its paint-spraying guns.

It is, therefore, a principal object of the present invention to provide an improved method and apparatus for spraying paint.

Another object is to provide a method and apparatus for spraying a uniform deposition of paint without excessive losses on a workpiece while in motion.

A further object is to provide a method and apparatus for spray painting a series of workpieces moving seriatim which combine the straight strokes of a reciprocator and the frequent passes of the rotary spraying technique.

A still further object is to provide a method and apparatus as described in which operation of the paint spraying means may be actuated by scanning means which sense a workpiece before it reaches the spraying apparatus.

Other objects will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In the accompanying drawings:

FIGURE 1 is a plan view, with parts broken away of two units for spray painting opposite sides of a workpiece, each unit embodying spray apparatus of the present invention;

FIGURE 2 is a front view of FIGURE 1 with parts broken away for purposes of illustration;

Figure 10:
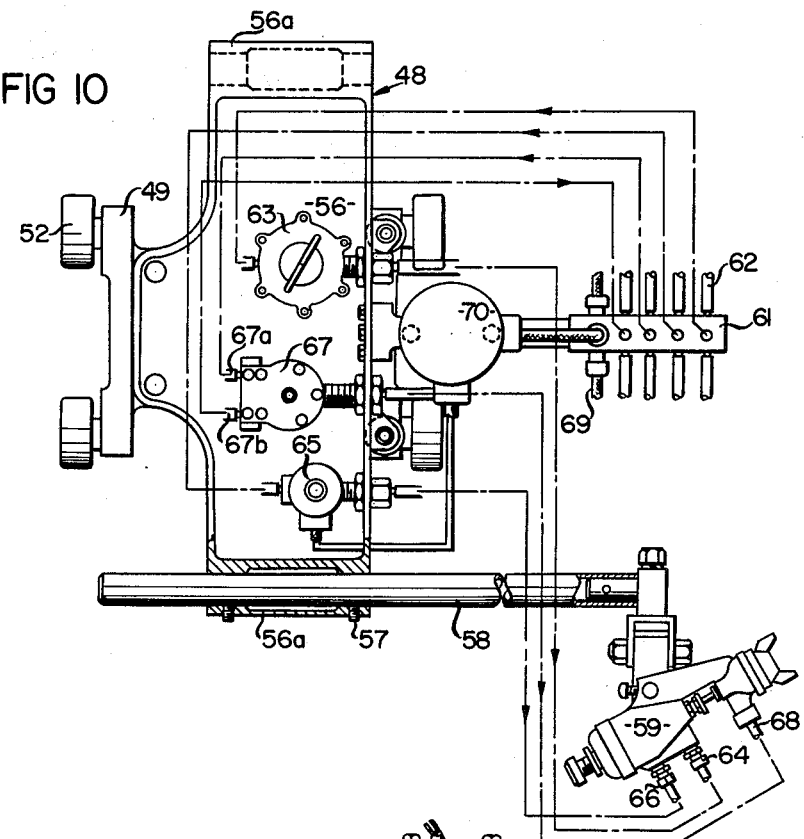
Figure 11:
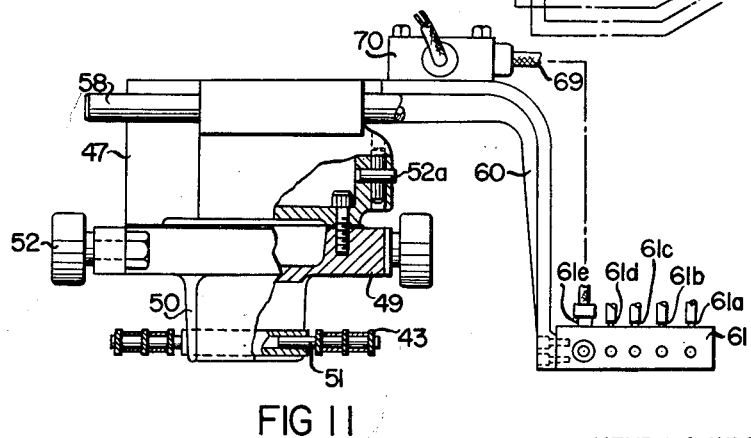
Figure 16:
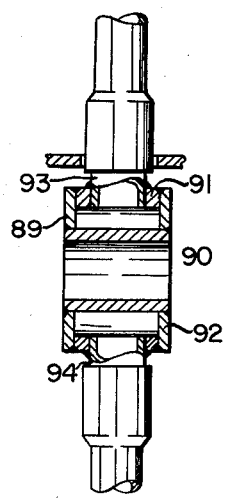
Figure 17:
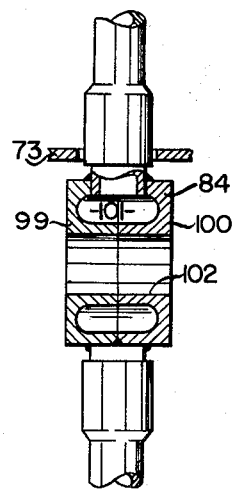
Figure 18:
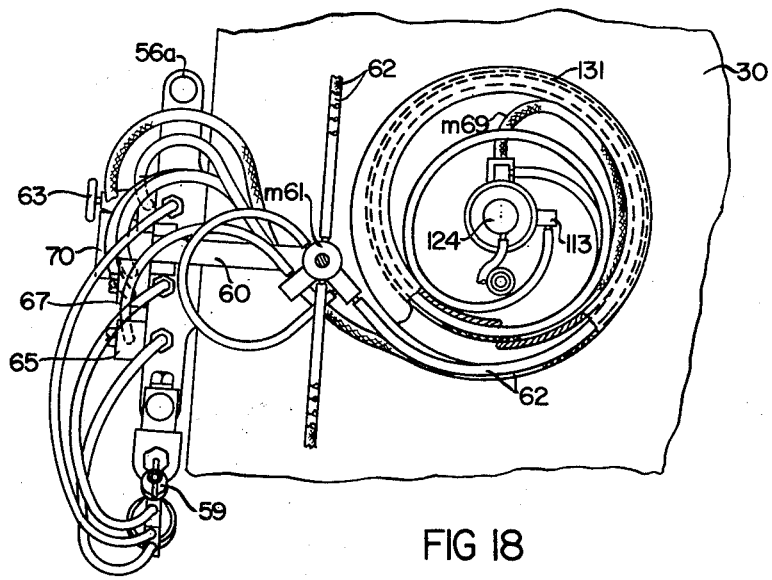
Figure 19:
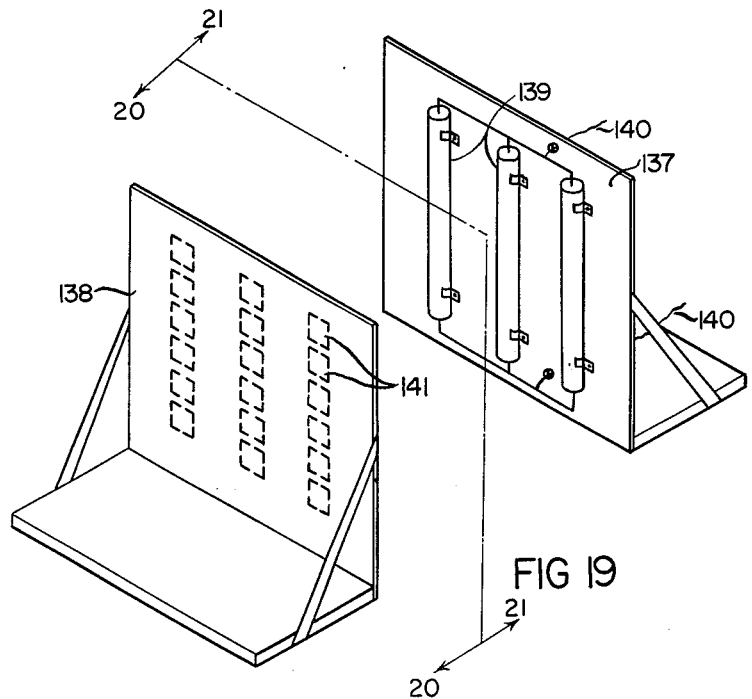
Figure 20:
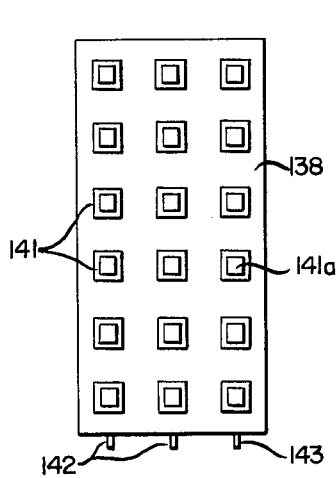
Figure 21:
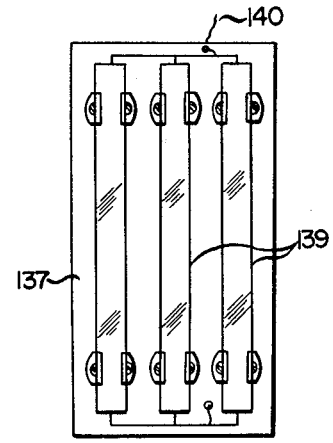
Figure 22:
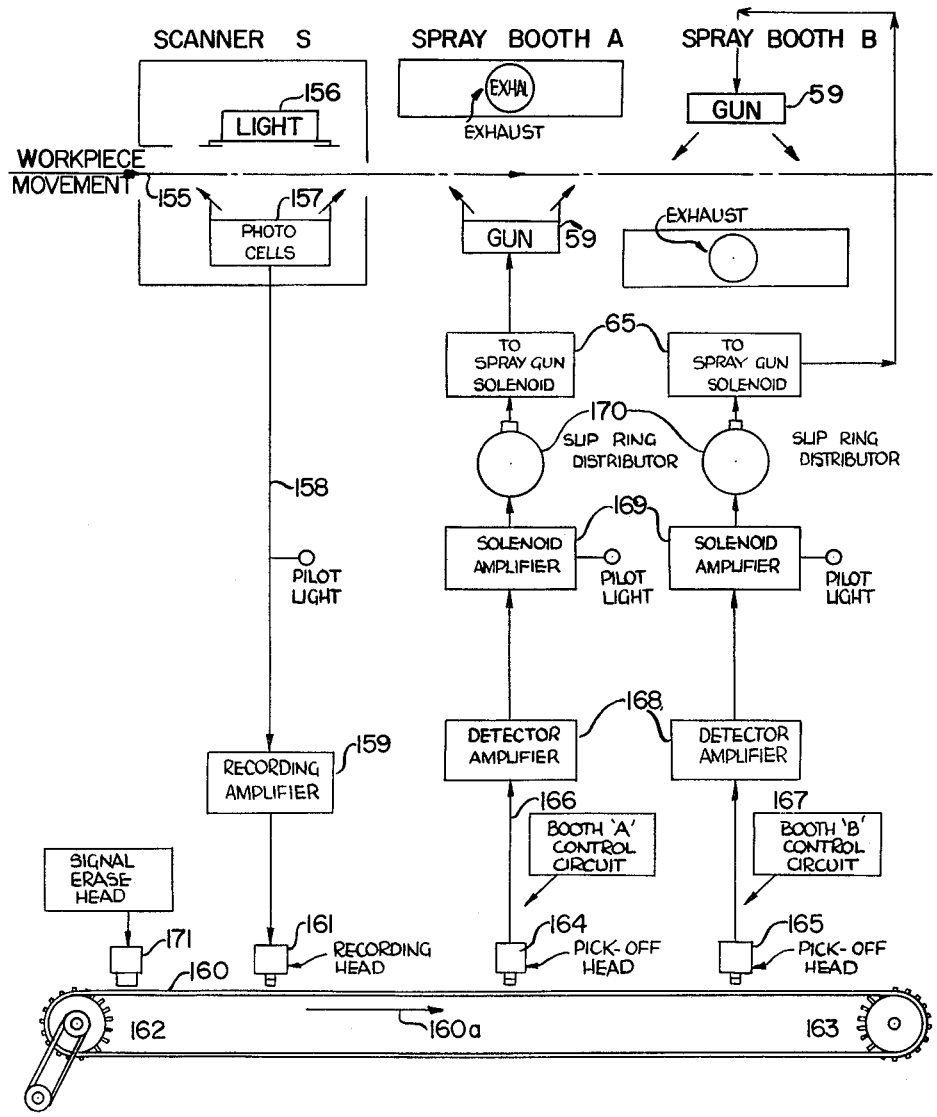

FIGURES 3 and 4 are enlarged front and side views, respectively, of the paint spraying apparatus of FIGURE 1 taken, respectively, on the lines 3—3 and 4—4;

FIGURES 5, 6, and 7 are sections of FIGURE 3 on the lines 5—5, 6—6, and 7—7, respectively;

FIGURE 8 is an enlarged sectional view of the right-hand portion of FIGURE 7;

FIGURE 9 is a section of FIGURE 8 on the line 9—9;

FIGURE 10 is an enlarged plan view of one of the ledges or carriages shown in FIGURES 3 and 4, here illustrated with an accompanying manifold;

FIGURE 11 is a side view of the ledge of FIGURE 10;

FIGURE 12 is a side view of a master manifold which is secured to one of the ledges as shown in FIGURE 10;

FIGURES 13, 14, and 15, are sections of FIGURE 12 on the lines 13—13, 14—14, 15—15, respectively;

FIGURE 16 is a section of FIGURE 15 on the line 16—16;

FIGURE 17 is a section similar to FIGURE 16 but taken through a four-way connector for conducting paint;

FIGURE 18 is a fragmentary front view of the paint spraying apparatus, illustrating the association of the distributor, winding drum, and master manifold;

FIGURE 19 is a front view of a scanning device for sensing a workpiece;

FIGURE 20 is a section of FIGURE 19 on the line 20—20;

FIGURE 21 is a side view of a carriage of the apparatus of FIGURE 19 showing a side connection for the carrier to a driving link chain;

FIGURE 22 is a schematic circuit diagram showing how the scanner device controls the operation of spray guns through the recordation of electrical impulses.

GENERAL DESCRIPTION

In accordance with the present invention, the paint spraying means is moved in a closed path having at least one linear segment which extends transversely of the direction in which a workpiece is moving. When several spray guns are moved seriatim in such a closed path, there is produced a continuous series of parallel upstroke passes (assuming the workpiece moves in a horizontal direction) and a continuous series of parallel downstroke passes that are closely spaced together on the workpiece as it is moved by a conveyor past the paint spraying means. Desirably, the closed path has two of such linear segments opposed to each other. One immediate advantage of this arrangement, particularly for three-dimensional spraying, is that in this motion, a spray gun facing the direction of movement of the workpiece while traversing the first of such linear segments also faces the direction of motion of the workpiece when traversing the second of such linear segments. Consequently, the vertical angles, the volume of paint, the air pressure, and other parameters can be adjusted for the best settings for both spray gun positions and then left unchanged as long as there is no change in conveyor speed.

The two linear segments of the closed path for the paint spraying means may be parallel. In this case, the two linear segments may be connected as by arcs of substantially equal radius. With this construction there results a continuous series of parallel upstroke passes and a continuous series of parallel downstroke passes for the guns.

It is also possible to have all the passes of actual paint deposition on a workpiece parallel to each other whether deposited on an upstroke or on a downstroke. This is accomplished in the present invention by so arranging the closed path of travel for the paint-spraying means that the two described linear segments are connected by arcs of unequal diameter, such linear segments being angled with respect to the vertical in the direction of movement of the workpiece. The effect is to equate the spray gun speed and stroke direction with the speed and direction of the workpiece (or conveyor), so that in traveling the closed path, the spray gun has a component of movement along the direction in which the workpiece moves that is equal to the movement of the workpiece. Thus, even though a spray gun is busily traversing a closed path and moves transversely of the direction of movement of a workpiece, relative movement between the spray gun and the workpiece in the direction in which the workpiece moves is canceled. The workpiece is painted as though it were stationary. In this embodiment of the invention, in which a spray gun moves with the workpiece in its direction of movement, the angle at which the paint-spraying means traverses the direction of movement of the workpiece is less than 90°.

Referring to FIGURES 1 and 2, since all exposed surfaces and edges (in three-dimensional spraying) must be covered, the workpiece is carried by an overhead conveyor of standard construction, in the direction of arrows 25 through spray booths A and B. In booth A, one side or face of a workpiece and nearest peripheral edges are sprayed, and in booth B the reverse side and peripheral edges are sprayed. The booths may comprise housings constructed from sheet metal and provided with ducts 26 for exhausting fumes. Spraying apparatus of the present invention generally indicated at 27 is positioned in each booth on opposite sides to spray across the conveyor path. If desired a water curtain may be provided as understood in the art on the far side of each booth to catch any overspray. The water and collected overspray accumulate in a sump on the floor of each booth. Suitable pumps 28 and pipes 29 circulate the water to provide the water curtain. Also if desired, as hereinafter more fully described, scanning means can be used to sense the approach of a workpiece toward the booths A and B for the purpose of controlling the timing of the paint-spraying means. Such a scanner is positioned before the spray booths, that is, to the right of the booths as viewed in FIGURE 1.

SPRAYING APPARATUS

FIGURES 3 to 18 illustrate the structure of one embodiment of the spraying apparatus and of certain of its component parts. For convenience of reference, the description of this form of the spraying apparatus is sectionalized and consists of: the basic structure of the apparatus which transverses the described closed path; the carriers or platforms and accompanying manifolds carried through this path; and the provision of utilities through the manifolds.

*Closed path construction*

Referring to FIGURES 3 through 6, the structure for effecting the travel of the paint-spraying means in a closed path includes a pair of support plates 30 and 31 held in spaced apart relation by flat beams 32 and 33. I-beams 34 are bolted to plate 31 and support the entire assembly over a suitable foundation generally indicated at 35. A pair of sprockets 36 and 37 are journaled for rotation between plates 30 and 31 on a shaft 38 near the bottom of the apparatus. Similarly a pair of sprockets 39 and 40 of smaller diameter are journaled on a shaft 41 carried in bearings 42 near the top of the apparatus. Double-stranded link chains 43 are trained about a sprocket of each pair lying in the same vertical plane. An electrical motor 44 carried on a suitable platform 45 drives the shaft 38 of the lower sprockets by a chain and gear assembly indicated at 46. Known means may be used to insure that the motor 45 drives the sprockets 36 and 37 at a substantially constant rate.

The chains 43 drive carriers 47 which are spaced therealong. Each carrier comprises a ledge or platform portion 48, hereinafter described more fully, bolted over a riding section 49 from which extend a pair of vanes 50 to define a yoke. As shown particularly in FIGURE 11 the yoke embraces within its slot an inward extension of pins 51 used to connect links of the chains 43. In this manner the chains 43 pull the carriers 47 along, the slot of the yoke accommodating any lateral movement of the carrier with respect to the chains.

The riding section 49 of each carrier has rollers 52 which travel in raceways in the plates 30 and 31 and thereby bear most of the weight of the carrier. Side rollers 52a also facilitate travel. In the embodiment illustrated, the raceways are formed by bolting strips 53 (FIGURES 5 and 6) on facing sides of the plates 30 and 31 so as to define between such strips a groove or raceway which receives the rollers 52. Such strips are curved adjacent the upper and lower sprockets so as to provide semi-circular raceways or grooves and thereby form a continuous track on each plate which permits the carriers 47 to follow the chains 43 in transversing a closed path about the upper and lower sprockets in the direction of arrows 54 and 55. As shown in FIGURE 3, this path consists of two opposite linear segments joined by arcs of different radii, the arcs being circumferential portions of the sprockets. If desired, the larger sprockets 36 and 37 may be placed at the top with the smaller sprockets 39 and 40 at the bottom. In this case, the chains 43 move in a direction opposite to that of the arrows 54 and 55.

*Carrier and manifold construction*

FIGURES 10 to 17 illustrate the platform construction of a carrier 48 and the construction of the manifolds, particularly the master manifold. Each carrier 48 includes a platform section 56 terminating in opposed sleeve portions 56a in which set screws 57 support an arm 58. A spray gun 59 of conventional design is fixed adjacent the end of an arm 58. Only one arm and gun are normally used on each platform section 56 for three dimensional spraying. It is preferred to have the spray guns on alternating pairs of adjacent carriers point toward the center line of the carrier and toward each other as gun 59 points in FIGURE 10, so that the sprays of such adjacent guns are always the same distance apart. Each platform section 56 has two end sleeve portions 56a to enable the carrier of that section to be paired with either adjacent carrier as desired. It will be noted that in this case, as the guns travel the closed path of FIGURE 3, each gun of a pair alternately points up and then down while maintaining the same relationship with respect to each other. In the reciprocator, a compromise is necessary because a gun pointing upwardly and traveling upwardly may be pointing in the direction of movement of a workpiece, but on the downstroke of such a gun it will be pointing away from the direction of motion of the workpiece.

An L-shaped bracket 60 bolted to the platform section 56 carries a manifold block 61 at one end. Except for the master manifold, hereinafter described, each manifold 61 is of the same construction and consists of openings extending through each block 61, each of such openings having a further communicating side opening to form a plurality of side-by-side T connections. Each T connection provides a certain utility needed to operate the spray gun 59. The T connections of each manifold block 61 are serially connected by a flexible hose 62, which may be made of nylon, to a matching T connection of the next manifold block 61 of the succeeding carrier 48, these connections being repeated from manifold-to-manifold about the closed path. As illustrated in FIGURE 11, the bracket 60 is of sufficient length to place the manifold block 61 opposite the chains 43, so that the hoses 62 attached to the manifolds make the same movement as the chains 43 in transversing the closed path.

Referring particularly to FIGURES 10 and 11, T connection 61a furnishes air, as indicated by the dot-dash lines, through an air pressure regulator 63 on the platform section 56 to an inlet line 64 on the spray gun 59. This air is used to atomize the paint supplied to gun 59 and is discharged into the atmosphere. T connection 61b furnishes air also, this air passing through an electrically operated solenoid 65 on the platform section and then into an inlet line 66 on the spray gun 59. This air is used to open outlet valve of the gun 59 and allow the paint and atomizing air to be discharged from the nozzle of the gun. T connection 61c advances fluid paint to a regulator 67 on the platform section 56 through inlet 67a. Regulator 67 controls the volume and pressure of the paint fed to an inlet line 68 on the gun 59. It is desirable to keep the paint in a state of steady circulation to prevent settling and the like. Accordingly, if the paint is not being advanced to the inlet line 68, the paint passes through outlet 67b to T connection 61d in the manifold block 61 and then passes to the next manifold as described. T connection 61e carries an electrical conduit 69 which passes through an explosion-proof box 70 for connection to the solenoid 65. Operation of the solenoid 65 in response to electrical signals or impulses applied thereto passes air to the gun 59 through inlet 66 to operate the gun and produce a paint spray pattern. The conduit 69 contains an individual wire for each solenoid on the carriages which conducts the electrical impulses to operate that solenoid. Conduit 69 further contains a common return wire connected in parallel to the solenoids.

Although the various utilities above described can be so passed from manifold-to-manifold, it is, of course, necessary to provide some juncture at which the utilities are initially provided and, if desired, recovered. This is accomplished by a master oscillating manifold illustrated particularly by FIGURES 12 to 17. The master manifold is attached to a bracket arm 60 and serves the same functions as the other manifolds 61 but, in addition, contains means for initial reception of the utilities. In brief, except for the electrical conduit, the master manifold M61 has a four-way connection corresponding to each of the T connections 61a, 61b, 61c, and 61d, and each of such master four-way connections is serviced by a pivotally mounted oscillating bar through which the utility is initially fed.

For example, the master manifold (FIGURE 12) includes a pair of terminal blocks 71 and 72 held in spaced apart relation by a strip 73 bolted thereto. Block 71 is bolted to a bracket 60 and together with block 72 carries a shaft 74 threaded at its opposite ends to engage a threaded opening in block 71 and a nut 75 which bears against block 72. Block 71 also has an opening 76 to pass the master electrical conduit M69 to an explosion box 70 carried on the bracket 60 connected to the master manifold M61. The electrical conduit leaves this box and travels to the next manifold to be there connected as shown in FIGURE 10.

Between the blocks 71 and 72 are four bars 77, 78, 79 and 80, of identical construction, which are pivotally carried on the shaft 74 for oscillation thereabout. Associated with these bars are four-way connectors 81 and 82, of identical construction, and four-way connectors 83 and 84 of identical construction which are somewhat different internally as compared to the internal construction of connectors 81 and 82. These four-way connectors are also carried on the shaft 74 but extend a fitting to one of their four ports through the strip 73 and therefore are not free to turn about the shaft 74.

The bars and four-way connectors just described are alternated along the shaft 74 so as to be paired together and form a cooperating unit. Washers 85 are spaced on either side of each of the oscillating bars to facilitate their pivotal movement. Each of the oscillating bars 77, 78, 79, and 80 (FIGURE 14) has an opening at one end to freely contain the shaft 74 and an L-shaped passage 86 at the other end formed by boring into the bar at its free end and again along its side to meet the first bore. Each of the resulting openings is enlarged to receive nipples 87 and 88, welded therin, over which a flexible hose is fitted. The oscillating bars 77, 78, 79, and 80 provide an anchoring point for the supply of utilities to the master manifold M61 and, in turn, receive the utilities from a rotary union hereinafter described.

Each of the four-way connectors 81 and 82 (FIGURES 15 and 16) comprises an annular chamber 89 that receives the shaft 74 through its central opening 90. Each chamber 89, constructed from a ring wall 91 and flat sides 92, has four bored openings to receive tubular fittings which are welded therein. Nipples 93 and 94 are opposed to each other, nipple 93 extending through the strip 73. Nipples 95 and 96 are substantially parallel, nipple 95 communicating with the chamber 89 through an insert 97 having an L-shaped passage 98 formed similarly to the passage 86 in the oscillating bar 77. Suitable flexible hoses generally shown at 62 fit over all of the nipples.

The four-way connectors 83 and 84 (FIGURES 13 and 17) are similar in general construction and purpose to the four-way connectors 81 and 82 except that the former have annular chambers of rounded, corner-free interiors. Since the connectors 83 and 84 pass fluid paint, their interiors are designed to prevent the build-up of settlings in corners and the like which could occur in the connector of FIGURE 16. Accordingly, four-way connectors 83 and 84 are constructed, as shown in FIGURE 17, of two annular sections 99 and 100 welded together. These sections have aligned matching grooves of curved sides so as to form a corner-free cavity or chamber 101. Connectors 83 and 84 ride the shaft 74 through their central openings 102 and have four nipples welded to their curved peripheries in a manner identical to that described for the connectors 81 and 82.

In practice, bar 77 receives air under pressure through nipple 87, passes the air out nipple 88 through a loop of the flexible hose 62 and then into chamber 89. From this chamber part of the air passes through the insert 97 and nipple 95 to the air pressure regulator 63 on the platform section 56 of the carrier associated with the master manifold M61. The remaining air passes out both nipples 93 and 94 to the T connections 61a of the other manifolds. This air pressure is used to operate the solenoids and the air is then discharged to the atmosphere.

The operation of the four-way connectors 82 and 83 is the same as that described for connector 81. Connector 82 furnishes air under pressure to the solenoid 65 on the carrier associated with the master manifold and to the T connections 61b of the other manifolds. This air pressure atomizes the paint discharge from gun 59 when the solenoid 65 is open, the air being released to the atmosphere. Connector 83 furnishes paint to the regulator 67 on the carrier associated with the master manifold and to the T connections 61c of the other manifolds. The paint which by-passes the regulators 67 returns to the four-way connector 84 of the master manifold or to the T connections 61d and then to the four-way connector 84. Since this connector is the paint return, the direction of movement within this part is opposite to that illustrated by FIGURE 14; namely, through nipples corresponding to 93, 94 and 95 and then through nipples 96, 88, bore 86 and nipple 87 to the rotary union.

*Rotary union and drum*

Since the chains 43 are continuously moving the carriers 47 and manifolds M61 and 61 and connecting flexible hoses 62 along the described closed path formed by the opposed sets of sprockets, it is difficult to provide utilities continuously to the master manifold without accounting for this motion. One manner of overcoming this problem is by a rotary union and drum illustrated by FIGURES 4, 7, 8, 9, and 18.

A tubular shaft 103 is mounted for rotation between plates 30 and 31 of the apparatus approximately midway between the upper and lower sprockets. Motor 44 also drives the shaft 103 by a sprocket 104 and a sprocket 105 on shaft 38 through a connecting chain 106. Shaft 103 rotates at a slower rate than shaft 38. For example, shaft 103 may rotate once as a carriage 47 makes one complete loop about the opposed sets of sprockets.

Shaft 103 terminates to the right of plate 30, as viewed in FIGURES 7 and 8, in a housing 107. The master electrical conduit M69 extends from an electrical rotary slip ring of conventional design (not shown) through the tubular shaft 103 and leaves laterally of the housing 107 through an insert 108. Bolts 109 secure a rotary union to the housing 108 which includes an annular section 110 having three separate passages. An annular cavity 111 in section 110 has a side opening 112 in which an elbow fitting 113 is welded and further communicates through a radially extending bore 114 in which an additional elbow fitting 115 is secured. A central tubular formation 116 of section 110 terminates in a bearing collar 117 which screws into the formation 116. A further tube 118, concentric with the tubular formation 116 and bearing collar 117, so seats at the inward end of the formation 116 as to isolate the area within the tube 118 from the annular area between that tube and the formation 116. A radially extending bore 119 connects tube 118 with an elbow fitting 120, and a radially extending bore 121 connects the annular area about the tube 118 with a still further elbow fitting 122.

The parts of the rotary union described so far rotate with the shaft 103. The stationary parts include a retainer cup 123 and a hub 124. The cap 123 has O-rings 125 to permit sliding engagement with an annular projection 126 and the tubular formation 116. A relatively large, rigidly held pipe 127 holds the cap 123 against rotation and connects with its interior as illustrated. The hub 124 has a bearing tip 128 which slidably engages the bearing collar 117 of the tubular formation 116. The hub 124 also provides a seat tightly to receive the tube 118 and thereby isolate the area within the tube from the outside annular area in the hub, much as the tube is seated at its other end within the tubular section 110. Radially disposed nipples 129 and 130 on the hub communicate, respectively, with the tube 118 and the annular area between this tube and the hub 124. These nipples also serve to hold the hub against rotation.

In practice, air is fed under pressure through the pipe 127, retainer cap 123, and the annular area 111. Part of the air exits through the bore 112 and nipple 113, while the remaining air leaves through bore 114 and fitting 115. A flexible hose 62 connects fitting 113 with the oscillating bar 77 of the master cylinder, and a similar flexible hose connects fitting 115 with the oscillating bar 78. Paint is forced through nipple 129 of the hub, through tube 118 and radial bore 119 out elbow fitting 120 which, in turn, is connected by a hose to the oscillating bar 79 of the master manifold. The paint returning from the oscillating bar 80 of the master manifold is directed by flexible hose through nipple 122 of the section 110 and then through the annular area outside of tube 118 and finally out the nipple 130.

In order further to protect fouling of various flexible hoses 62 and the master electrical conduit M69 as the carriages 48 transverse the described closed path, a flanged drum 131 is employed. The hub of this drum is free to turn about a wear collar 132 (FIGURE 7) fixed to the plate 30 and is held in place by the tubular section 110. In a 90° section of the drum 131, the radius is gradually reduced to form a slotted opening 133 through which the two hoses conducting air and the two hoses conducting paint as well as the master electrical conduit pass from the inside and outside of the drum 131. The hoses and conduit are then coiled around the drum several loops before going to the master manifold as described. A flat spring 134 is coiled between the shaft 103 and the drum 131 like a watch spring. One end of the spring is fastened to a pin 135 on a flange of a bushing, and the other end of the spring is fastened to a pin 136 on the back plate of the drum 131.

*Scanning device*

It is possible to operate the spray guns 59 by manual means as the carriages move through the described paths. One need merely supply electrical current through the means described to the solenoids 65 at desired times in order to effect a paint spray. However, it is preferred to use a scanning device which automatically controls the moment and duration of the period for operating such guns. One technique is to scan or detect a workpiece as it approaches the paint spraying apparatus, particularly its general outline, electrically record the detections as impulses on a tape, and then use the recorded detections to operate the spray guns. It is possible to use stationary detectors or scanners, as illustrated in FIGURES 19 to 21 and by the schematic diagram of FIGURE 22.

Referring to these figures, the scanner may comprise a panel 137 providing a source of light and a panel 138 carrying a plurality of light-sensitive or beam-sensitive devices. The panel 137 supports a series of lights such as fluorescent tubes 139 which are conventionally energized by electrical leads 140 and may for this purpose be connected in parallel.

Panel 138 carries photoelectric cells 141 as the light-sensitive device. Means sensitive to infrared waves, radio active, or radio waves could be used instead. In the embodiment illustrated, the panel 138 has a plurality of receptacles into which photoelectric or photocells 141 are secured. Each photocell has a light-sensitive bridge or patch 141a usually maintained in an evacuated envelope, which is connected in parallel as by conductors 142 and 143 to a commonly applied electromotive force. The conductors are suitably insulated from each other and from the conductors of companion photocells, although the conductors may be grouped together if desired for convenience in a large flexible conduit. The photoelectric cells may be of the photoemissive, photo-voltaic, or photoconductive types, suitable amplifying means being employed where needed in a manner known in the art. Photoconductive cells have been found particularly suited for the described purpose. Such cells may contain selenium, cadmium sulfide, thallous sulfide, lead sulfide, or silicon as the light-sensitive means.

A circuit for operating a spray gun in response to the detections of a scanner of FIGURES 19 to 21 may be of the type illustrated by FIGURE 22. One manner of recording electrical signals on a tape and using a "pick off" head to operate a battery of spray guns in accordance with the recorded signals is described in U.S. Patent No. 2,754,795 which is hereby incorporated by reference. Alternatively, the system of U.S. Patent No. 2,565,655, which is also hereby incorporated by reference, may be employed. In this case, a detector moves with or as a function of the movement of a spray gun carrier. The signals established by the detector are applied to a moving strip of tape in the form of perforations. The perforations are later used to energize a system controlling the firing of spray guns.

Reverting to the electrically recorded tape system, which is preferred, and to the diagrammatic circuit of FIGURE 22, the scanner S precedes spray booths A and B with respect to the path of travel of a workpiece as indicated by the arrow 155. A bank of lights 156, which may correspond to the series of vertically disposed fluorescent tubes as shown on panel 137, is placed opposite a photosensitive plate 157 which may be the panel 138 of FIGURES 19 to 21. In the absence of a workpiece, the light impinges on the cells of the plate 157 to complete a circuit and record a signal through line 158 and a recording amplifier 159 on a tape 160 by means of a recording head 161. In this case, when a workpiece interrupts the light from the bank 156, no signal is recorded on the tape 160 for a time depending upon the size and general outline of the workpiece. By this arrangement, the lack of a recorded signal causes the spray guns to operate. The reverse system can also be used; that is, interruption of the light completes a circuit to record a signal which is then used to operate a spray gun.

In either event, a driven sprocket 162 and an idler sprocket 163, about which the tape 160 is trained, moves the tape in the direction of arrow 160a. The speed of the tape is such that it reaches "pick-off" heads 161 and 165 just as the workpiece reaches spray booth A and B, respectively. The "pick-off" heads are energized by a lack of recorded signal (or, conversely, by a recorded signal as mentioned) in a manner known in the art to pass electrical impulses through lines 166 and 167 containing amplifiers 168 and 169, slip ring distributors 170 (because of the continuous circular movement of the chains 43) and then to solenoids 65 which open to pass pressurized air and thereby operate spray guns 59 as previously described. The slip ring distributors may be placed on the left-hand end of shaft 103 as viewed in FIGURE 7. Before passing the recording head 161 again, the tape passes an eraser head 171 which removes the previously recorded signals.

OVERALL OPERATION

After the speed of the overhead conveyor or workpiece which the conveyor carries and the speed of the guns 59 have been synchronized so as to provide the desired component of movement for the guns in a direction paralleling the direction of the workpiece, there is no need for further adjustment. As the workpiece approaches the spray booths A and B, the scanner S detects its passage and interrupts the recording of a signal on the tape 160 in accordance with the length and general outline of the workpiece.

Meanwhile, the chains 43 are continuously traveling about the opposed set of upper and lower sprockets. The utilities including air, paint feed, paint return, and electrical energy are simultaneously supplied to their individual circuits being continuously advanced, except for the paint return, from the rotary union or distributor, which acts like a reservoir for the utilities, to the master manifold M61 and then serially to the subsidiary manifolds spaced about the chains 43. During this time, the drum 131 and shaft 103 have an oscillating-rotating motion. As the master manifold M61 moves about the described closed path, the distance between it and the rotary union alternatively decreases and increases (from about 2 inches to about 48 inches twice per revolution in one installation). Due to the drum spring 134 maintaining the hoses 62 in a taut condition, the drum 131 is continually oscillating, thereby winding and unwinding the hose. In addition to this oscillating motion, the drum 131 also revolves once as the master manifold makes one revolution through the closed path. The drum actually revolves with the chains 43 about one revolution and then unwinds about one-half a revolution per cycle. In this manner, the hoses or tubing 62 have a self-storing action. In one embodiment, the effective length of the hoses increased fivefold and returned to its original length twice during one trip of the master manifold around the closed path.

The tape reaches the "pick-off" heads 164 and 165 as the workpiece reaches the booths A and B, respectively, so that the guns 59 are operated only during the time some portion of the workpiece is within the discharge path of the guns. In this manner, first one side and then the reverse side of the workpiece are spray painted. Preferably the guns 59 are shut off as they round the arcs of unequal radii defined by the upper and lower sprockets in order to reduce overspray. By making the upper turn smaller in diameter than the bottom turn, the spray guns, whether advancing up or down, are able to advance horizontally at the same rate as the conveyor moves horizontally. Whether sprockets of equal or unequal diameter are used, a spray gun can begin spraying at the bottom and spray a leading edge of a rectangular workpiece all the way to the top and conversely on the return or downstroke.

In one specific embodiment, the upper sprockets 39 and 40 had a radius of 6 inches, and the lower sprockets 36 and 37 had a radius of 12 inches. The centers of the opposed sets of sprockets were spaced vertically apart 80.25 inches leaving linear segments of 80 inches on the opposed converging sides of the defined path. The chains were driven at a speed of 40 inches per second which imparted a component of movement for the spray guns of 3 inches per second in a direction paralleling the direction in which the workpiece moved.

In comparison with a reciprocator, the motion provided by the present method and apparatus offers the following advantages:

(1) Many more gun carriages can be used instead of one, eight being illustrated in the present embodiment.

(2) Gun speed can be considerably increased because there is no stopping and reversing of the guns at the top and bottom of a stroke.

(3) On vertically (as well as horizontally) mounted machines, the speed is uniform on both the upstroke and downstroke.

(4) With multiple guns, there is negligible air interference from one gun to the next.

(5) The conveyor speed and the stroke speed can each be materially increased.

(6) Overlapping of gun sprays can, if desired, be increased to as much as 75 percent even with longer strokes and faster conveyor speeds.

(7) The edges of workpieces can be sprayed with less overspray loss and with more uniform application because the passes occur more frequently.

(8) More uniform coatings can be obtained, with less concern about accurate gun spray adjustments, because of more frequent passes and greater overlapping possibilities.

(9) In three-dimensional spraying (face and sides) the more frequent passes possible with the present invention result in a much better coverage of the edges as the spraying angle hitting the edges strikes them at a much more definite angle.

(10) Electrical signals to operate the spray guns (both on and off) can be individually controlled on both the downstroke and on the upstroke, so that the spray guns operate at desired times and for desired intervals, thereby minimizing overspray losses.

The present method and apparatus provides the following advantages over a strictly rotary (circular) motion:

(1) There is no difference in coating thicknesses between the top and bottom portions of the stroke.

(2) When a strictly circular stroke is used, it must follow a small radius to provide proper overlapping or additional overspray occurs on the vertical portions of the stroke.

(3) The present closed path of gun movement avoids additional on-off action of guns which is necessary in a strictly circular path to spray leading vertical edges.

(4) The spraying of three-dimensional work is considerably improved because the guns do not strictly follow the circumferential motion of a supporting wheel.

Other forms embodying the features of the invention may be employed, change being made as regards the features herein disclosed, provided those stated by any of the following claims or the equivalent of such features be employed.

We therefore particularly point out and distinctly claim as our invention:

1. A method of spray painting a workpiece moving in a predetermined direction of travel comprising moving spray guns transversely of such direction and in a closed path, traversing the spray guns along such closed path, furnishing paint, air and like utilities to one of the spray guns, forwarding such utilities from gun-to-gun along the closed path of movement, and recovering from such one gun any unused utility.

2. A method of spray painting a workpiece having a substantially planar surface moving in a predetermined direction of travel comprising moving a plurality of spray guns seriatim transversely of such direction and in a closed path having opposed linear segments contained in a plane substantially parallel to such planar surface, traversing such spray guns along such closed path at a rate sufficient to provide a component of movement for the spray guns in such direction which is substantially equal to the component of movement of the workpiece in such direction, providing within such closed path a reservoir of utilities for such spray guns including air, paint, and the like, furnishing such utilities from the reservoir to one of the spray guns, and forwarding such utilities from gun-to-gun along the closed path of movement.

3. A method of spray painting a workpiece having a substantially planar surface moving in a predetermined direction of travel comprising detecting the passage of a workpiece along such path, simultaneously moving spray guns transversely of such direction and in a closed non-intersecting path having opposed spaced-apart linear segments contained in a plane substantially parallel to such planar surface and converging toward one side of such predetermined direction, traversing the spray guns along such closed path at a rate sufficient to provide a component of movement for the spray guns in such direction which is substantially equal to the component of movement of the workpiece in such predetermined direction and thereby cancel relative movement between the workpiece and spray guns in such predetermined direction of travel when traversing such linear segments, furnishing paint, air, and like utilities to one of the spray guns, forwarding such utilities from gun-to-gun along the closed path of movement, operating the spray guns in accordance with such detections as the workpiece reaches such guns, and recovering any unused paint utility from such one spray gun.

4. Paint spraying apparatus including sprockets of unequal diameter mounted for rotation in spaced apart relation in substantially the same plane, a chain trained about said sprockets defining a closed non-intersecting path of travel, means to drive one of the sprockets at a substantially constant rate, a plurality of support carriages spaced along and carried by said chain, a spray gun on each support carriage, a master manifold carried by one of said carriages, subsidiary manifolds serially connected to the master manifold and carried by the remaining support carriages, means to supply utilities including air and paint separately to the master manifold, means to transmit said utilities from manifold-to-manifold, and means on each support carriage to operate the spray gun thereon from such utilities supplied to the manifold of that support carriage.

5. Paint spraying apparatus including sprockets of unequal diameter mounted for rotation in spaced apart relation within substantially the same plane, a chain trained about said sprockets, means to dry one of the sprockets at a substantially constant rate, a plurality of support carriages spaced along and carried by said chain, a spray-gun on each support carriage, a master manifold carried by one of said carriages, subsidiary manifolds on the remaining support carriage, conduit means serially connecting all said manifolds, feed and return conduits connected to the master manifold to supply thereto utilities including air and paint and thus serially to the subsidiary manifolds also through said conduit means, a drum mounted for rotation between said spaced apart sprockets to receive and pay out the feed and return conduits during travel of said chain, and means on each support carriage to operate the spray gun thereon from such utilities supplied to the manifold of that support carriage.

6. Paint spraying apparatus including sprockets of unequal diameter mounted for rotation in spaced apart relation within substantially the same plane, a chain trained about said sprockets, means to drive one of the sprockets at a substantially constant rate, a plurality of support carriages spaced along and carried by said chain, a spray gun on each support carriage, a master manifold carried by one of said carriages, subsidiary manifolds on the remaining support carriages, distributor means mounted between said spaced apart sprockets and within the path described by said chain to receive air and paint and to provide a paint return, flexible hoses connecting said distributor means with the master manifold to feed the air and paint thereto and receive the paint return, a drum adapted for rotation supported about the distributor to receive and pay out the feed and return flexible hoses during travel of said chain about said spaced apart sprockets, additional flexible hoses serially connecting all of said manifolds to circulate the air and paint from the master manifold to the other manifolds and to return the paint back to the master manifold, and means on each support carriage to operate the spray gun carried thereby at selected times from such air and paint supplied to the manifold of that support carriage.

7. Paint spraying apparatus including a pair of spaced apart upstanding support plates, sprockets of unequal diameter mounted between the plates in spaced apart relation for rotation, a chain trained about said sprockets, means to drive one of said sprockets at a substantially constant rate, said support plates having matching grooves defining tracks, a plurality of support carriages having means to ride in said tracks and being attached to and spaced along said chain, a spray gun on each support carriage angled toward a spray gun of an adjacent support carriage, a master manifold carried by one support carriage and subsidiary manifolds on the remaining support carriages, distributor means mounted on one of said plates between said spaced apart sprockets to receive utilities including air, paint, and an electrical conduit, flexible hoses connecting said distributor means with the master manifold to supply such air and paint thereto, said electrical conduit also extending to the master manifold, an additional hose joining the master manifold and distributor means to define a paint return line, a drum having a peripheral slot carried about the distributor means to receive said flexible hoses and electrical conduit through said slot for winding thereabout prior to connection with said master manifold, said drum being freely rotatable about said distributor means to receive and pay out the flexible hoses and electrical conduit as required during travel of said chain about said sprockets, additional flexible hoses and electrical conduit serially connecting all of said manifolds to forward the air, paint, and electrical energy, respectively, to the other manifolds, means to return unused paint back to the master manifold, and means on each support carriage to operate the spray guns carried thereby at selected times from such utilities supplied to the manifold of that support carriage.

8. The apparatus of claim 7 further including means to rotate said drum at a rate sufficiently less than the rate of travel of said chain to maintain the hoses and electrical conduit extending from the drum in a substantially taut condition.

9. The apparatus of claim 7 further including a coil spring connecting said drum and said distributor means to assist in maintaining the hoses and electrical conduit in a substantially taut condition.

10. Paint spraying apparatus including sprocket means mounted for rotation in spaced apart relation in substantially the same plane, a chain member trained about said sprocket means defining a closed non-intersecting path of travel, means to drive one of the sprocket means at a substantially constant rate, a plurality of support carriages spaced along and carried by said chain, a spray gun on each support carriage, a master manifold carried by one of said carriages, subsidiary manifolds serially connected to the master manifold and carried by other support carriages, means to supply utilities including air and paint to the master manifold, means to transmit said utilities from manifold-to-manifold, and means on each support carriage to operate the spray gun thereon from such utilities supplied to the manifold of that support carriage.

11. Paint spraying apparatus including a chain member mounted to move in the direction of its length in a closed non-intersecting path of travel, a plurality of paint spraying means spaced along and carried by said chain member, hose means to connect one of said paint spraying means to a stationary supply of utilities, additional hose means to connect said one spraying means to a next spraying means along the chain member and from that spraying means to each succeeding spraying means serially.

12. Paint spraying apparatus including a closed chain member mounted to move in the direction of its length in a closed non-intersecting path of travel, a plurality of paint spraying means spaced along and carried by said chain member, a stationary supply of utilities including paint and air stationed substantially within the extremities defined by said closed path of travel, hose means connecting said stationary supply only to one of said paint spraying means, additional hose means serially connecting said one paint spraying means to a next paint spraying means carried by the chain member and from that paint spraying means to each succeeding paint spraying means to supply the utilities thereto and finally back to said one paint spraying means, and means to recover any unused utility returned to said one paint spraying means, whereby the chain member can travel its defined path without intertangling said different hose means.

13. The paint spraying apparatus of claim 12 wherein said stationary supply of utilities includes a drum mounted for rotation and adapted during travel of the chain member along its defined path to pay out and receive said hose means connecting said stationary supply and said one paint spraying means.

References Cited by the Examiner

UNITED STATES PATENTS

| | | | |
|---|---|---|---|
| 1,929,896 | 10/33 | Merritt et al. | 118—323 |
| 2,293,881 | 8/42 | Bailey | 118—323 |
| 2,488,519 | 11/49 | Andrews et al. | 118—6 |
| 2,565,655 | 8/51 | Girando | 118—7 |
| 2,588,125 | 3/52 | Knowland et al. | 117—104 |
| 2,754,795 | 7/56 | Eussle | 118—2 |
| 2,925,801 | 2/60 | Bivens et al. | 118—323 |
| 3,008,648 | 11/61 | Brady et al. | 118—323 |
| 3,039,429 | 6/62 | Mains | 118—109 |

RICHARD D. NEVIUS, *Primary Examiner.*